(No Model.)

W. K. OMICK.
AIR BRAKE.

No. 563,612. Patented July 7, 1896.

Witnesses
O. F. Barthel
M. D. Doherty

Inventor
William K. Omick
By [signature]
Attys.

THE NORRIS PETERS CO., PHOTO-LITHO., WASHINGTON, D. C.

UNITED STATES PATENT OFFICE.

WILLIAM K. OMICK, OF PONTIAC, MICHIGAN, ASSIGNOR OF ONE-HALF TO WILLIAM DUFFUS, OF SAME PLACE.

AIR-BRAKE.

SPECIFICATION forming part of Letters Patent No. 563,612, dated July 7, 1896.

Application filed October 29, 1895. Serial No. 567,234. (No model.)

*To all whom it may concern:*

Be it known that I, WILLIAM K. OMICK, a citizen of the United States, residing at Pontiac, in the county of Oakland and State of Michigan, have invented certain new and useful Improvements in Air-Brakes, of which the following is a specification, reference being had therein to the accompanying drawings.

The invention consists in the construction, arrangement, and combination of the various parts of an air-brake apparatus whereby the construction of such devices is simplified and improved without detracting in any way from its capability for use in applying brakes under all the conditions which are found to exist in the operation of railway-trains, all as more fully hereinafter described.

Figure 1:
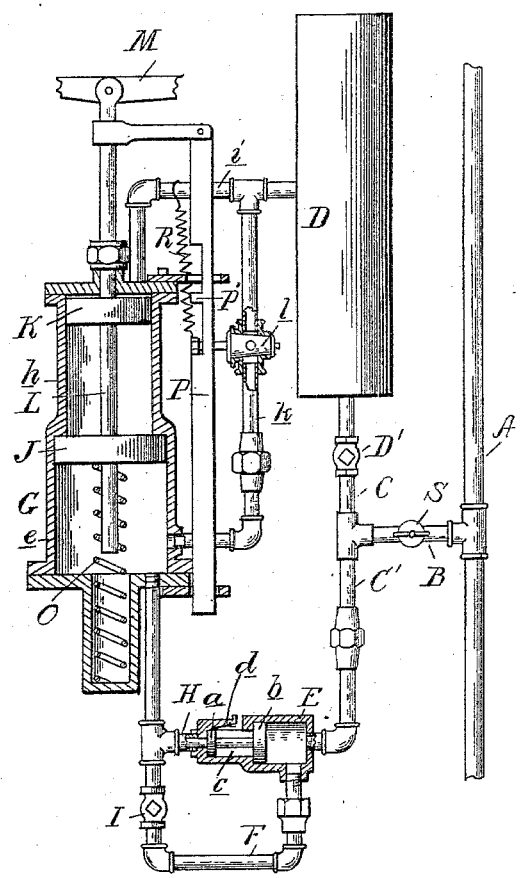
Figure 2:
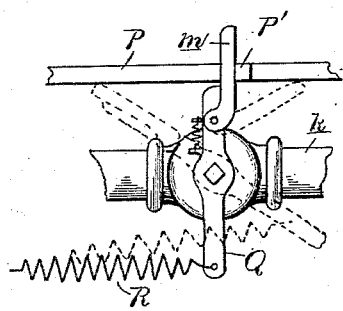

In the drawings, Figure 1 is a top plan view of my apparatus, showing it applied to a railway-car, the casing of the cylinder and controlling-valves being in section. Fig. 2 is a side elevation of the equalizer-valve and its operating devices.

A is the train-pipe, which has a suitable controlling-valve on the locomotive. (Not shown.)

B is a branch pipe on each car, which is in turn branched into the pipes C C'. The pipe C leads into the reservoir-tank D and has a suitable check-valve D' to prevent the return of air therefrom. The pipe C' leads to the end of the casing or cylinder E, in which are the two pistons $a$ $b$ of different diameter working in corresponding portions of the cylinder and on a common stem. Between the pistons is an exhaust-port $c$, and on the inner face of the cylinder is the tapering groove $d$, leading to this port from near the end of the smaller section of the cylinder.

F is a pipe leading from the large end of the cylinder E to the large end of the cylinder G, H being a connecting-pipe from the pipe F to the small end of cylinder E. I is a check-valve in pipe F before it reaches pipe H.

The cylinder G is of two diameters, the larger end $e$ having a piston J therein and the smaller end $h$ having a piston K, both on the common piston-rod L, which connects to the brake mechanism, it being shown as connected to a lever M.

The reservoir D is connected to the small end of the cylinder G by a pipe $i$, and with the large end of the cylinder by a by-pass or equalizing-pipe $k$, controlled by a valve, such as the plug-cock $l$.

O is a spring acting with its tension to keep the pistons in the position shown in Fig. 1.

P is a trip-bar sliding in guides beside the cylinder and connected to the piston-rod to move therewith. This bar has the trip finger or lug P', adapted in the return of the piston to momentarily open the cock $l$. This is accomplished by means of the lever Q, connected to the stem of the plug-cock $l$, having the spring-latch $m$ projecting into the path of the lug, this latch being free to turn on its pivot in one direction, but being rigid against opposite movement, so that as the lug P' strikes it as it travels one way the latch is rocked without affecting the lever, but in its return movement rocking the lever and opening the valve, which, as soon as the lug has passed, is closed by the spring R, connected to the lever, as shown.

S is a shut-off valve in the branch pipe B.

The parts being thus constructed and arranged they are intended to operate as follows: The air under pressure being supplied to the train-pipe passes through pipe C into reservoir D, the check-valve D' serving to maintain the pressure therein, regardless of the fall in the train-pipe. The air from train-pipe is conducted by pipe C' to cylinder E and by pipe F to the large end of cylinder G. The pressure upon the large piston in cylinder E holds the valve therein in position to close port $c$, as shown in Fig. 1, while the pressure on piston J overcomes that on piston K and holds these pistons as shown in Fig. 1, in which position the brake is off. To apply the brake, the engineer reduces the pressure in the train-pipe, when, the pressure on the piston K remaining substantially constant, the pressure on piston J is reduced, because as pressure is lowered in train-pipe, the pressure on small piston $a$ remaining constant, the pressure on piston $b$ being reduced, the valve will be shifted, opening the port $c$. By means of the inclined groove $d$ the size of this opening is proportionate to the decrease in pressure. As soon as the port $c$ is open the air will exhaust from the large end of the cylinder G and the pressure on the small piston K will actuate the brakes. Just as soon as the pressure begins to equalize at opposite ends of cylinder E that valve closes the port c and thus can absolutely control the amount of application of the brake without undue loss of air proportionate to the reduction of pressure in the train-pipe. As the pressure is restored in the train-pipe the pressure is increased on piston J and the brakes relieved. In this movement of the piston J the valve l is opened to quickly equalize the pressure in the opposite cylinder and reservoir, so that if brakes are desired to be reapplied before normal pressure is obtained in train-pipe, the air-pressure on the pistons K and J will be proper to give the movement. Otherwise, with reduced pressure, due to several applications of the brake, it would take too long to release.

My device is simple and puts the control of the brake entirely in the engineer's hands, and he can regulate the degree of application by regulating the train-pipe pressure. It will be seen that I dispense with the complicated triple valve ordinarily used and with auxiliary emergency-stop devices, as the desired power can be obtained by the fluctuations of pressure in the train-pipe.

What I claim as my invention is—

1. In an air-brake apparatus, the combination of the train-pipe, a reservoir, a branch pipe between the same and the train-pipe, a brake-cylinder having pistons of different area, a pipe connection between one end of the cylinder and the reservoir, a direct connection between the other end of the cylinder and the train-pipe, and an exhaust-valve in the last-named connection adapted to be opened automatically, substantially as described.

2. In an air-brake apparatus, the combination of the train-pipe, the reservoir, the cylinder, the piston-rod having pistons of different area, connections to opposite ends of the cylinder from the reservoir and train-pipe respectively, a valve-casing in the train-pipe connection, a valve therein having heads of different area, subjected to the train-pipe and cylinder pressure respectively, an interposed check-valve, and an exhaust-port controlled by the movement of the valve, substantially as described.

3. In an air-brake apparatus, the combination of the train-pipe, cylinder, having ends of different area, reservoir, pistons and connections as described, of a by-pass between the reservoir and the large end of the cylinder, a self-closing valve therein and a trip for temporarily opening the valve in the releasing movement of the piston, substantially as described.

4. In an air-brake apparatus, the combination of the train-pipe, cylinder, reservoir, pistons and connections as described, of the by-pass k between the reservoir and cylinder, a valve therein having self-closing devices, a bar connected to the piston, having a tripping-lug therein, an operating-lever for the valve and a pivoted pawl thereon in the path of the lug, substantially as described.

In testimony whereof I affix my signature in presence of two witnesses.

WILLIAM K. OMICK.

Witnesses:
M. B. O'DOGHERTY,
O. F. BARTHEL.